April 26, 1955

J. E. HOLT 2,707,004

PICKER CONSTRUCTION

Filed April 4, 1952

INVENTOR.
John E. Holt
BY Nathaniel Fuchs
ATTORNEY

April 26, 1955  J. E. HOLT  2,707,004
PICKER CONSTRUCTION
Filed April 4, 1952

INVENTOR.
BY John E. Holt
Nathaniel Frucht
ATTORNEY

United States Patent Office 2,707,004
Patented Apr. 26, 1955

2,707,004
PICKER CONSTRUCTION

John E. Holt, Danielson, Conn., assignor to The Danielson Manufacturing Company, a corporation of Connecticut Application April 4, 1952, Serial No. 280,495

5 Claims. (Cl. 139—160)

The present invention relates to textile machinery, and has particular reference to a novel construction for a loom picker.

The principal object of the invention is to provide an improved picker construction having increased ability to withstand impact and pooling.

Another object of the invention is to provide an improved light weight picker made of a smaller volume of material than is customarily used.

A further object is to materially reduce manufacturing costs by decreasing molding time for the pickers.

An additional object is to produce a picker of thermoplastic materials having greatly enlarged surface area and a greatly increased operating life.

Figure 1:
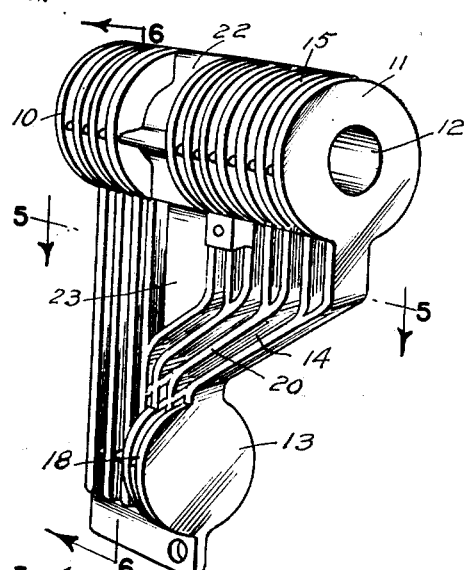
Fig. 1 is a perspective view of an illustrative picker made in accordance with the invention.

It has been found desirable to mold pickers of thermoplastic resins of the polymer amide type, and specifically nylon, as the resulting pickers outwear rawhide or rubber pickers of similar construction by approximately three to one. To this end, I have utilized a nylon compound which is quite viscous but very fast setting, and I have found it advisable to very greatly increase the surface thereof, thus providing an extremely tough article for withstanding impact and for preventing pooling. The resulting picker is comparable in price to standard rawhide and rubber pickers, but has greatly increased life and effectiveness.

Referring to the drawings, the picker 10 is of standard type such as is used in a Crompton & Knowles loom, and includes a base 11 having a longitudinal bore 12 and an impact head 13 joined to the base section by an intermediate section 14. As illustrated, the picker has a very large surface area in proportion to its volume, the base having a series of parallel generally circular spaced disks 15 with intermediate angularly positioned ribs 16 and a central cylindrical portion 17, the head having similar spaced generally circular disks 18 with transverse ribs 19 similar to the base ribs 16, and the intermediate section including spaced panels 20 shaped to conform to and integrally join the base section and the head ribs and having intermediate vertical ribs 21. The base may have an intermediate section including only the central cylindrical portion and ribs 22, and the intermediate section may have a corresponding web partition 23.

The body portion of the picker is thus made of thin transverse portions separated by deep corrugations, with longitudinal ribs, between the thin transverse portions and in the lines of strain, thus providing a more effective and stronger picker, as nylon moldings are tougher on the surface than in the center of thick sections, and the provision of disks and deep corrugations with supporting ribs vastly increases the picker surface and the picker strength.

Figure 2:
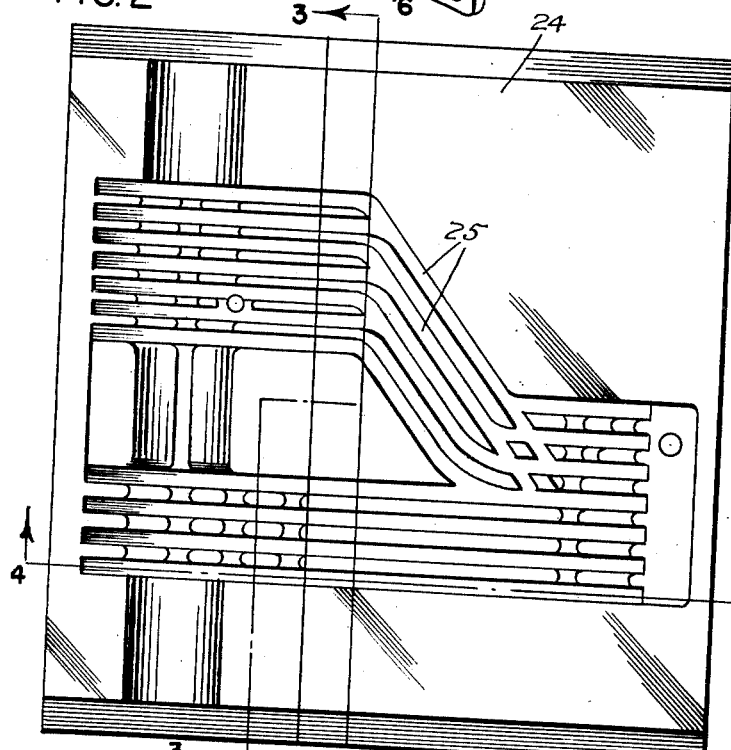
Fig. 2 is a plan view of the lower portion of a mold therefor, the upper portion being of similar design.
Figure 3:
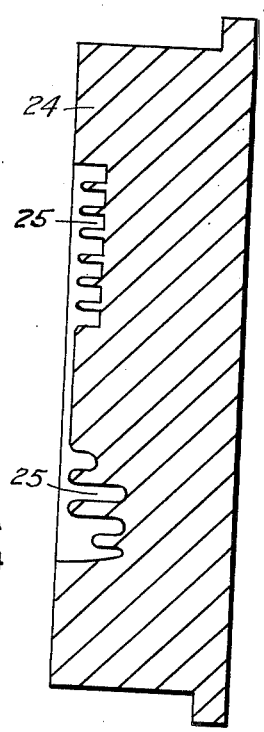
Fig. 3 is a side view of Fig. 2.
Figure 4:
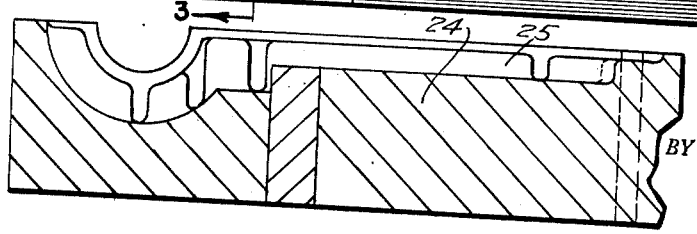
Fig. 4 is a section on the line 4—4 of Fig. 2.

One preferred type of mold is illustrated in Figs. 2, 3 and 4, and includes a lower section 24 and a similar upper section, not shown, shaped to correspond to the picker, the sections having grooves 25 corresponding to the picker body and ribs.

Figure 5:
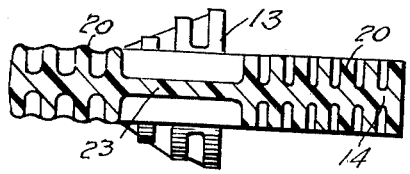
Fig. 5 is a section on the line 5—5 of Fig. 1.
Figure 6:
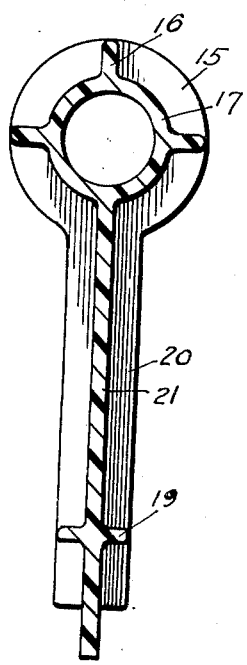
Fig. 6 is a section on the line 6—6 of Fig. 1.

The preferred spacing of the ribs is shown in Figs. 5 and 6, which are sections on the line 5—5 and 6—6 of Fig. 1. The ribs at the forward end of the intermediate section are closer together than the rear ribs, to provide strength sinews or ribs at the forward end where strain occurs.

The preferred plastic material is a nylon compound having the characteristics of being quite viscous but fast setting, the commercial name of this nylon being FE 2081. This nylon has sufficient strength to withstand impact, and has a substantial safety factor on pooling, as it resists the building up of sufficient heat at the point of shuttle impact to melt the nylon.

The formation of spaced disks and deep corrugations as illustrated decreases manufacturing costs, as there is a substantial saving in material, the saving in the picker as illustrated being 40%; in addition the molds can be made for larger numbers, as the mold size is controlled by the number of ounces of material required for each molding, and the time for each molding cycle is lessened as there is quicker chilling of the thermoplastic in the innermost mold recesses. The production cost is thus sharply reduced.

Figure 7:
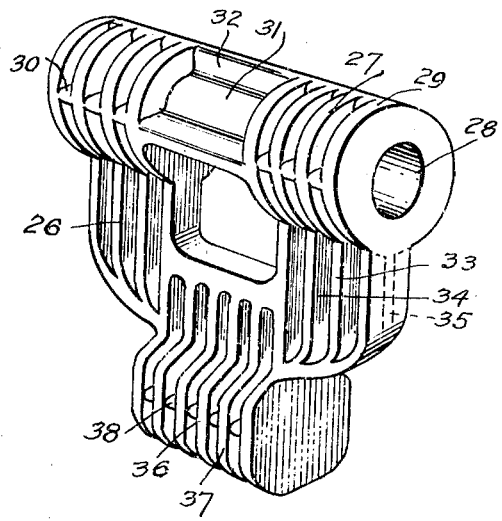
Fig. 7 is a perspective view of a different type of picker embodying the invention.

The invention may be applied to other types of pickers, the reversible type picker 26, see Fig. 7, including a body 27 with cylindrical bore 28 and spaced circular type disks 29 having angularly disposed supporting ribs 30 and a central section 31 joined by angularly disposed axial ribs 32, a U-shaped intermediate portion 33 with panels 34 and supporting ribs 35, of the type shown in Fig. 6, and a double impact head 36 having spaced disks 37 with angular supporting ribs 38.

Although I have disclosed a specific disk construction particularly suitable for the illustrated pickers, it is obvious that changes in the size, shape and arrangement of the ribs may be made to meet corrugation requirements for different picker types, and that the invention may be applied to other molded plastics requiring great strength and toughness, without departing from the spirit or the scope of the invention as defined in the appended claims.

I claim:

1. A one-piece picker of thermoplastic material, having a base with a central cylindrical body having an axial bore therethrough, an impact head and an intermediate connecting section between the base and the head, the base body having forward, rear and intermediate portions, the forward and rear portions each having a series of spaced adjacently positioned circular disks with angularly positioned connecting ribs therebetween, the head including spaced adjacently positioned circular disks with angularly positioned connecting ribs therebetween, and the intermediate connecting section having spaced panels joining the base and head, said panels being adjacently positioned with reinforcing ribs therebetween.

2. In the article of claim 1, the base forward portion disks being in closer adjacency than the base rear portion disks.

3. In the article of claim 2, the base body intermediate portion including connecting ribs extending between the rear disk of the base body front portion and the front disk of the base body rear portion.

4. In the article of claim 3, the intermediate connecting section panels depending from the base body disks.

5. In the article of claim 4, the intermediate connecting section having a transverse web portion between the panel depending from the rear disk of the base body front portion and the front disk of the base body rear portion.

(References on following page)

References Cited in the file of this patent

UNITED STATES PATENTS

| | | |
|---|---|---|
| Re. 19,000 | Scribner | Nov. 14, 1933 |
| 1,852,812 | Leiby | Apr. 5, 1932 |
| 2,300,760 | Amigo | Nov. 3, 1942 |
| 2,357,010 | Krueger | Aug. 29, 1944 |
| 2,564,424 | Chadbourne | Aug. 14, 1951 |

FOREIGN PATENTS

| | | |
|---|---|---|
| 6,291 | Great Britain | of 1884 |
| 606 | Great Britain | of 1910 |